(12) United States Patent
Blanton et al.

(10) Patent No.: US 7,335,899 B2
(45) Date of Patent: Feb. 26, 2008

(54) MEDIA FOR DETECTION OF X-RAY EXPOSURE

(75) Inventors: Thomas N. Blanton, Rochester, NY (US); Mridula Nair, Penfield, NY (US); Joseph F. Bringley, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 202 days.

(21) Appl. No.: 11/003,969

(22) Filed: Dec. 3, 2004

(65) Prior Publication Data

US 2006/0118732 A1  Jun. 8, 2006

(51) Int. Cl.
*G01N 5/00* (2006.01)
(52) U.S. Cl. .................... 250/474.1; 252/600
(58) Field of Classification Search ............. 250/474.1; 252/600
See application file for complete search history.

(56) References Cited

U.S. PATENT DOCUMENTS

| 3,811,895 A | | 5/1974 | Ehrlich |
| 4,489,240 A | | 12/1984 | Kronenberg et al. |
| 5,084,623 A | * | 1/1992 | Lewis et al. ............. 250/474.1 |
| 6,114,707 A | * | 9/2000 | Willems et al. .......... 250/484.2 |
| 6,406,914 B1 | * | 6/2002 | Kaburaki et al. ............... 436/1 |
| 2001/0046275 A1 | | 11/2001 | Hussein |

FOREIGN PATENT DOCUMENTS

SU  277123  6/1989

OTHER PUBLICATIONS

Zagorski, Z, A thin, composite sodium chloride dosimeter with diffuse reflected light spectrophotometric read out, 2000, Journal of Radioanalytical and Nuclear Chemistry, vol. 245, No. 2, pp. 233-236.*
Rabin, H, Formation of F Centers at Low and Room Temperatures, 1960, Physical Review, vol. 117, No. 4, pp. 1005-1010.*
Meli-Gaikazyan, I., Radiative Generation of F Ceters in KCI and KCI (Pb) Crystals Grown from Aqueous Solutions, 1972, Consultants Bureau, pp. 836-840.*
www.webexhibits.org/causes of color12.html.*
F. Miller, *College Physics*, 4th ed. Harcourt Brace Jovanovich Inc., 1977, p. 324.

* cited by examiner

*Primary Examiner*—Christine Sung
(74) *Attorney, Agent, or Firm*—Andrew J. Anderson; Paul A. Leipold

(57) ABSTRACT

The invention relates to An X-ray exposure indicator device comprising a solid X-ray sensitive material that upon X-ray exposure undergoes a chromatic change, wherein the exposure indicator device does not significantly change color when subjected to UV or visible radiation.

25 Claims, 4 Drawing Sheets

MEDIA FOR DETECTION OF X-RAY EXPOSURE

FIELD OF THE INVENTION

This invention relates to the field of X-ray detection devices.

BACKGROUND OF THE INVENTION

Security and safety at national and international transportation facilities such as airports, train-stations and waterports has become of vital importance. Ensuring the safety and integrity of transported items such as baggage, packages, shipments, etc. continues to be a major challenge for transportation and commercial commerce industries. X-ray irradiation methods have been developed for screening transported items for the presence of illicit and/or harmful materials, however, such methods are often slow and laborsome and further give no indication as to whether an item has been inspected, nor confirms that screening has been completed. Simple confirmation methods are desired which indicate the safety and integrity of transported items.

Prior art describes a color-indicating X-radiation dosimeter based on the color change of dyes by radiation-induced chemical reactions. These indicators are used typically for radiation sterilization of food and other items. Such sterilization procedures require very large X-ray doses, several orders of magnitude greater than X-irradiation levels used in transportation security systems.

The prior art also describes radiochromic films such as GafChromic HD-810, a thin almost colorless radiochromic diacteylene monomer, coated on a transparent polyester base that undergoes solid-state polymerization when irradiated with X-rays. The radiation-induced polymerization of the colorless film leads to the formation of a deep blue product. An FWT-60 series of radiochromic dosimeters are designed such that thin colorless films containing aminotriphenyl methane dyes gradually change to deep blue in relation to absorbed X-ray dose. However a limitation of the HD-810 and FWT-60 films is that they are also photochromically responsive to ultraviolet light and ambient light. Exposure of these films to indoor or outdoor lighting conditions, before or after X-ray exposure, will result in a color change. Therefore it would not be possible to determine if the color change was due to an inspection by an airport X-ray scanner or ambient light.

U.S. Pat. No. 4,489,240 describes a radiochromic leuco dye dosimeter that includes a plastic tube containing a solution of a radiochromic dye, which is sensitive to ionizing radiation. A change in optical density of the solution is employed to measure the radiation-induced adsorption of the leuco dye. This last step requires a spectrophotometer and would be expensive and cumbersome to employ in the transportation industry.

Soviet Union Patent 277123 describes a chemical ionizing radiation dosimeter that uses a composition containing triphenyl tetrazolium chloride. US patent application 2001/00462-75 A1 describes a nonrotating X-ray system and methods for three-dimensional, three parameter imaging of objects for the purposes of identifying non-intrusively their material content. The system and methods are useful, for instance in detecting explosives, narcotics, or other contraband materials in passenger luggage or shipped parcels.

While providing color-indicating X-ray dosimetry, the prior examples do not describe a method to verify that transported items were indeed X-rayed. This is particularly critical when airport luggage is held for any period of time between X-raying and loading onto the plane. Therefore it is desirable to develop tamperproof X-radiation indicators to provide positive visual verification that an item has been subject to X-radiation. This is particularly useful in airports and other transportation centers. It is also desirable that such indicators are easily attached to the screened item such as aircraft, train, bus, or cruise ship luggage and packages and be tamperproof, and provide immediate, recognizable changes upon X-radiation. The advantage of such a system is convenient visual verification of the radiation treatment, prevention of fraud, and proof of proper examination. A further requirement of such an indicator is the ability to be sensitive to X-radiation, and show no photochromic effects due to other forms of electromagnetic radiation (also referred to as radiation or light) including ultraviolet, visible, infrared, microwave, radiowave, and ambient light. An additional requirement is an indicator that will immediately show evidence of a color change and will require no additional chemical or physical processing steps to observe the color change after X-ray exposure. Such a verification system is also handy to distinguish between exposed and unexposed X-ray cassettes in medical and other X-ray imaging.

PROBLEM TO BE SOLVED BY THE INVENTION

The invention provides an X-ray sensitive indicator that changes color when exposed to X-ray radiation, without additional processing of the indicator after X-ray exposure. The invention further provides a tamper proof package containing the said X-ray indicator. The invention further provides an indicator that is not sensitive to visible or ultraviolet radiation. The invention further provides an X-ray sensitive indicator that can be easily and conveniently attached to baggage or freight and provides instantaneous confirmation that said items have been passed through an X-ray screening machine.

SUMMARY OF THE INVENTION

It is an object to provide a packaging material wherein the said X-ray sensitive material undergoes a chromatic change upon X-ray exposure and not upon other forms of exposure such as UV exposure.

It is a still further object to provide a packaging material wherein the said adhesive is pressure sensitive such that it provides a tamper proof X-rayed image.

These and other objects of the invention are accomplished by an X-ray exposure indicator device comprising a solid X-ray sensitive material that upon X-ray exposure undergoes a chromatic change, wherein the exposure indicator device does not significantly change color when subjected to UV or visible radiation.

ADVANTAGEOUS EFFECT OF THE INVENTION

The invention provides a tamper proof identification system that visually indicates whether a package or object has been irradiated by X-radiation.

DETAILED DESCRIPTION OF THE INVENTION

The invention has numerous advantages. The materials used for this invention can be combined to make a tamper proof X-ray indicator. Upon X-ray exposure, the indicator changes color. The device does not change color upon exposure to UV, visible or infrared light. The color change upon X-ray exposure allows anyone inspecting a package or object to quickly acknowledge if the package or object has been exposed to X-rays. The color change occurs without expensive or time consuming chemical or physical processing steps. Furthermore, the methods for preparing the article can utilize known manufacturing procedures and is inexpensive. These and other advantages will be apparent from the detailed description below.

The invention provides an X-ray exposure indicator device comprising a solid X-ray sensitive material that upon X-ray exposure undergoes a chromatic change, wherein the exposure indicator device does not significantly change color when subjected to UV or visible radiation.

The X-ray indicator is comprised of an X-ray sensitive component and may include a binder, may include an adhesive and may include a base material.

A base material (or substrate) may be utilized with the indicator of this invention. The substrate is preferably flexible and may be reflective, opaque, or transparent. The base material could be a metal or metal alloy foil. Polymer substrates are preferred as the base material because they are tear resistant, have excellent conformability, good chemical resistance and have good strength. Preferred polymer substrates include polyester, oriented polyolefin such as polyethylene and polypropylene, cast polyolefins such as polypropylene and polyethylene, polystyrene, acetate, cellulose acetates and vinyl. Other base materials that may be used in this invention include cellulosic papers and synthetic papers. The above-described base materials may also include laminated or unlaminated multilayer structures. The base could contain or be coated with a magnetic recording element capable of recording a magnetic signal before, during, or after X-ray exposure. The base could contain or be coated with an optical recording element capable of recording an optical signal before, during, or after X-ray exposure.

A pressure sensitive adhesive may be utilized in this invention. The adhesive would enable the X-ray indicator element to be affixed onto a surface. The pressure sensitive adhesive also ensures that the label will be tamperproof. A part of the tamperproof system additives may be introduced into the adhesive such that peeling the label would cause a distortion of the image. The pressure sensitive adhesive is an adhesive system that forms of bond with a surface upon contact with the surface under pressure. A pressure sensitive adhesive that is most preferred is one that forms a permanent bond with the surface. A permanent pressure sensitive adhesive bond is one that yields a peel strength of greater than 200 g/5 cm. Suitable adhesives of this invention may be inorganic or organic, natural or synthetic, that are capable of bonding the element to the desired surface by surface attachment. Examples of pressure sensitive adhesives include the acrylics, urethane and styrenic polymers and copolymers, including natural and man-made rubbers. These polymers may be coated from water and or organic solvent, in the formulation that contains tackifiers, plasticizers and the like.

The X-ray element containing the pressure sensitive adhesive is preferably attached to a liner material that carries the pressure sensitive adhesive, the base material and the X-ray sensitive material. The liner must be peelable from the pressure sensitive adhesive. A peelable liner or back is preferred as the pressure sensitive adhesive required for adhesion of the label to the package can not be transported through labeling equipment without the liner. The liner provides strength for conveyance and protects the pressure sensitive adhesive prior to application to the package. A preferred liner material is cellulosic paper. Another preferred liner material is a sheet of polymer.

Figure 1:
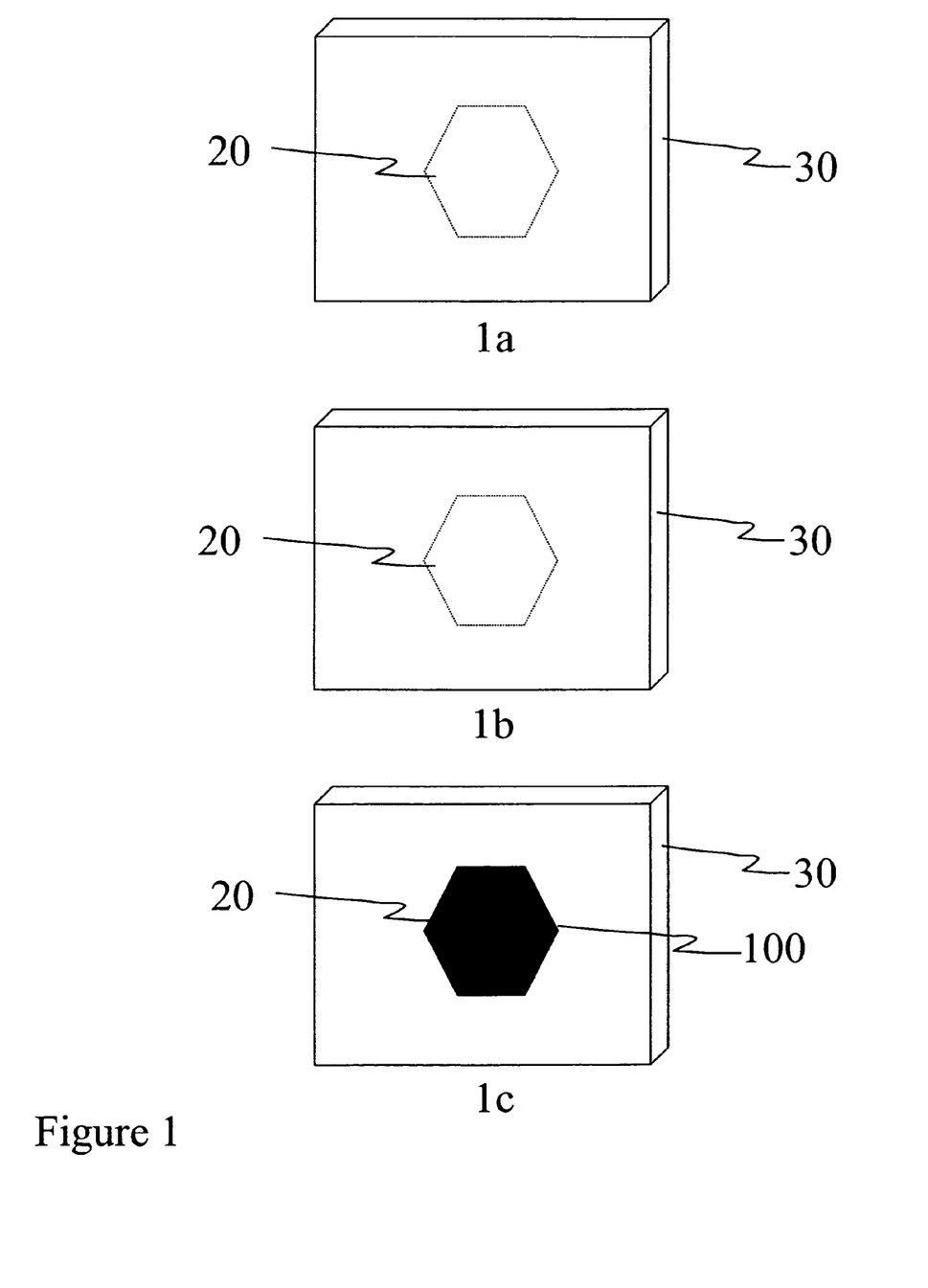
FIG. 1—Exposure of X-ray indicator by (a) visible radiation, (b) UV radiation, (c) X-ray radiation.

A binder generally is utilized in this invention. The binder is preferably mixed with the X-ray sensitive component. The binder can be flexible or rigid and formed of any suitable polymer. The binder can be comprised of homopolymers and copolymers such as polyesters, vinyl polymers including acrylics and styrenics e.g. styrene and chlorostyrene; monoolefins, e.g. ethylene, propylene, butylene and isoprene; vinyl esters, e.g. vinyl chloride, vinyl acetate, vinyl propionate, vinyl benzoate and vinyl butyrate; α-methylene aliphatic monocarboxylic acid esters, e.g. methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g. vinyl methyl ether, vinyl ethyl ether and vinyl butyl ether; and vinyl ketones, e.g. vinyl methyl ketone, vinyl hexyl ketone and vinyl isopropenyl ketone. Particularly desirable binder resins include polyacrylic resin, polystyrene resin, polyester resin, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. The X-ray sensitive component will show a color change upon exposure to X-ray radiation but will not show a color change when exposed to indoor or outdoor ambient light, including ultraviolet light as shown in FIG. 1. In FIG. 1 is the X-ray indicator with an X-ray sensitive material 20 coated on a base 30 after irradiation by (1a) visible radiation, (1b) UV radiation, (1c) X-ray radiation. The visible image 100 seen on FIG. 1c is due to the X-ray sensitive material 20 undergoing a chromic change due to exposure to X-ray radiation. As described by Miller (F. Miller, College Physics 4$^{th}$ ed. Harcourt Brace Jovanovich Inc., 1977, p. 324), visible light has an approximate wavelength of $8\times10^{-7}$ to $4\times10^{-7}$ m, UV light has an approximate wavelength of $4\times10^{-7}$ to $1\times10^{-9}$ m, and X-ray light has an approximate wavelength of $1\times10^{-9}$ to $1\times10^{-11}$ m. Preferably, the X-ray sensitive component will not show a color change after 24 hours exposure to ambient light and more preferably will not show a color change for at least 48 hours exposure to ambient light. A color change is defined as an optical density change of at least 0.1 and preferably 0.5. A change in optical density may be measured precisely using an optical densitometer; typically optical density changes (or differences) of greater than 0.1 are readily observable to the human eye. This X-ray induced color change could be clear to colored, colored to clear, white to black, white to a color comprised of any combination of the primary colors red, green, and blue or any combination of the secondary colors yellow, cyan, and magenta. The X-ray sensitive component can show a color change of any combination of primary colors red, green, and blue to any combination of primary colors red, green, and blue; any combination of primary colors red, green, and blue to any combination of secondary colors yellow, cyan, and magenta; any combination of secondary colors yellow, cyan, and magenta to any combination of secondary colors yellow, cyan, and magenta; or any combination of secondary colors yellow, cyan, and magenta to any combination of primary colors red, green and blue. The X-ray sensitive component can show a chromic change that could be patterned to reveal an object such as a picture or alphanumeric.

Figure 2:
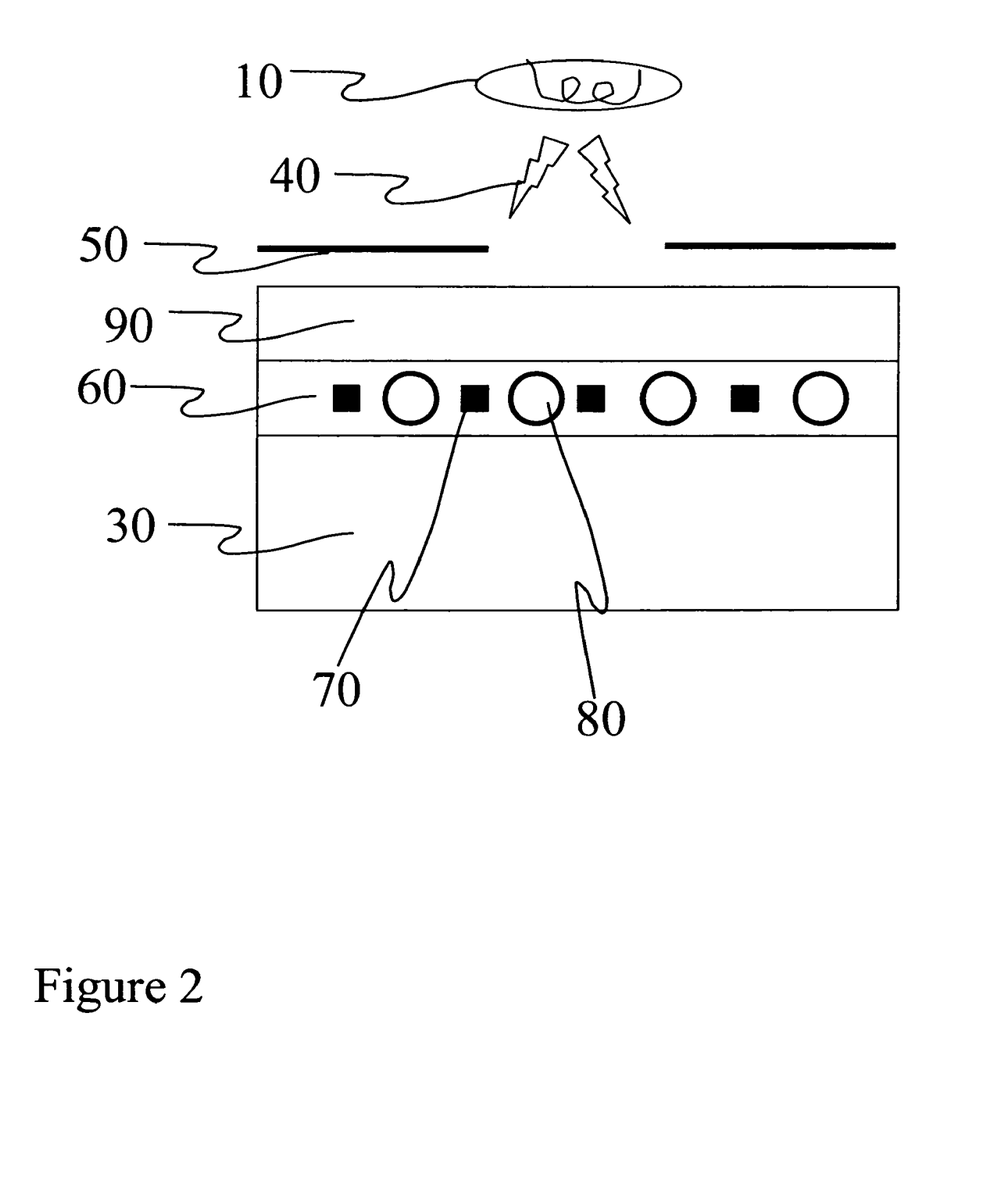
FIG. 2—Cross section of an X-ray indicator with a phosphor being irradiated by X-ray radiation.

The X-ray sensitive component can be inorganic, organic, or polymeric. However, not all inorganic, organic, or polymeric materials are usable as X-ray sensitive components. Inorganic materials can be comprised of one or more chemical elements, metals, salts, oxides, carbonates, carbides, and other compounds of chemical elements other than carbon, with ionic, covalent, and/or metallic bonds. Salts can include alkali metal salts, alkaline metal salts, and transition metal salts. Oxides can include alkali metal oxides, alkaline metal oxides, transition metal oxides, lanthanide oxides, and actinide oxides. Carbonates can include alkali metal carbonates and alkaline metal carbonates. Organic compounds are defined as containing the element carbon with one or more covalent bonds and are most often isolated or synthesized from petroleum, coal, vegetable, or animal sources, as well as synthesized from other organic, carbonate, or cyanide compounds. Organic compounds can be dyes, organic amines, and triphenyl tetrazolium salts. Organic materials can also be comprised of carbon and other chemical elements to give organometallic phases. Organometallic phases can be alkali metal EDTA phases. Polymeric materials are comprised of many small repeat structural units and can be organic or inorganic. These polymers can be formed by addition polymerization or condensation polymerization. Polymeric phases can be epoxies. The X-ray sensitive component can be a composite. The composite can be made from two or more inorganic phases, two or more organic phases, two or more polymers, or a combination of two or more inorganic, organic, or polymeric phases. The composite could be comprised of an X-ray phosphor and a photochromic material that undergoes a photochromic change when said phosphor is excited by exposure to X-ray radiation as shown in FIG. 2. The composite could be exposed directly with the X-ray beam, or with a mask, such as a patterned lead or other X-ray absorbing sheet, to create the necessary color change indicating that an X-ray exposure has occurred as shown in FIG. 2. The composite could alternatively be comprised of a mixture of X-ray absorbing material and a photochromic material. FIG. 2 shows the cross section of an X-ray indicator being irradiated by an X-ray source 10 wherein X-ray sensitive material 60 comprises an X-ray phosphor 70 and a photochromic material 80 wherein said photochromic material 80 undergoes a chromatic change when X-ray phosphor 70 is excited by exposure to X-ray radiation 40. A mask 50 is used to create a pattern on said X-ray indicator. The substrate 20 of the composite is below the X-ray sensitive material 60. UV blocker 90 is used to prevent any excitation of the X-ray phosphor 70 from UV radiation, or any chromic change to photochromic material 80.

Figure 3:
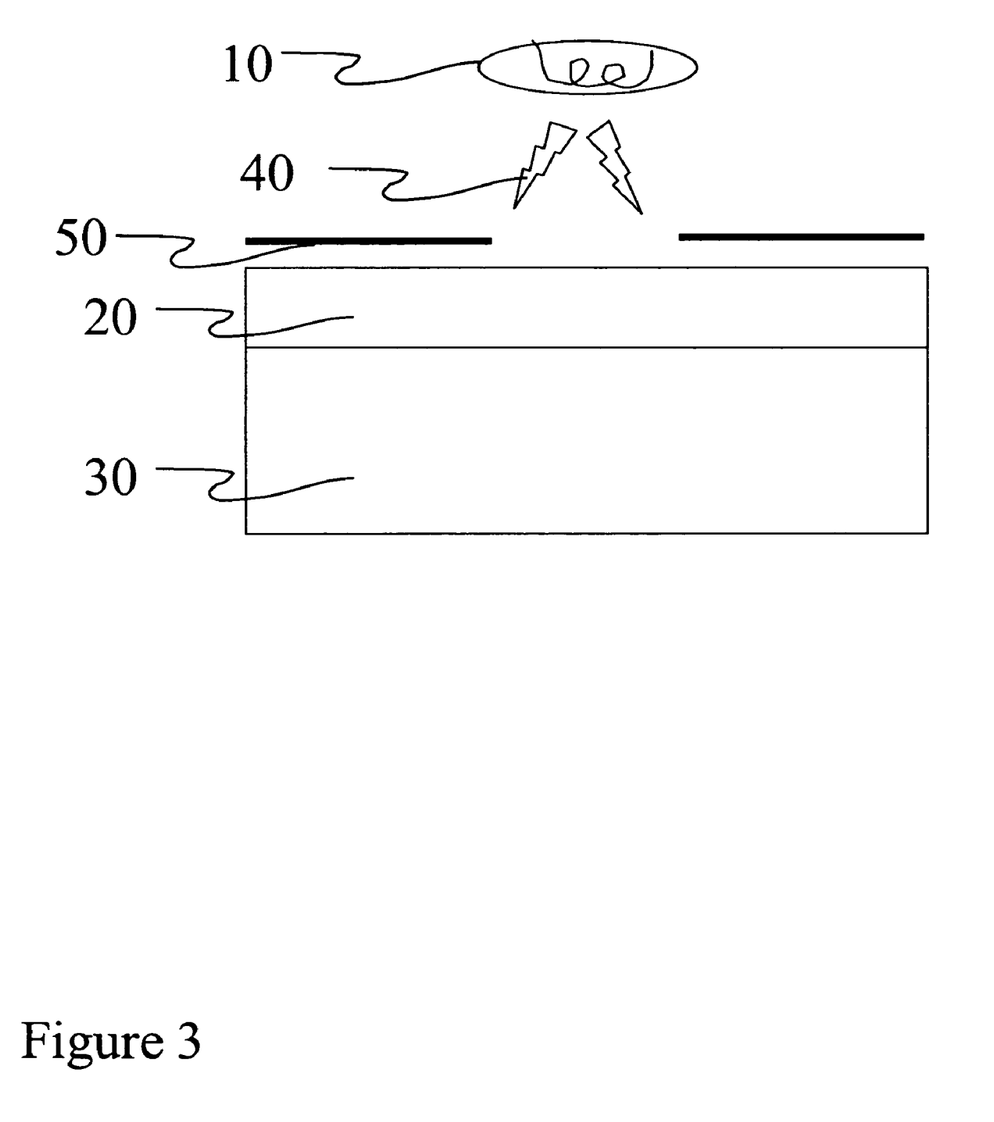
FIG. 3—Cross section of an X-ray indicator being irradiated by X-ray radiation.

The X-ray sensitive material can be stand alone, coated onto a support as shown in FIG. 3, mixed with a binder and coated onto a base or support, or mixed with the base. The final product could be one or multiple layers. The final product could be exposed directly with the X-ray beam, or with a mask, such as a patterned lead or other X-ray absorbing sheet, to create the necessary color change indicating that an X-ray exposure has occurred as shown in FIG. 3. FIG. 3 shows the cross section of an X-ray indicator being irradiated by an X-ray source 10 wherein X-ray sensitive material 20 coated on a base 30 undergoes a chromatic change when exposed to X-ray radiation 40. A mask 50 is used to create a pattern on said X-ray indicator.

Illustrated below are embodiments of the invention with layer structures indicated.

---

Embodiment 1

X-ray sensitive material
Embodiment 2

X-ray sensitive material in binder
Embodiment 3

X-ray sensitive material in adhesive
Embodiment 4

X-ray sensitive material in substrate
Embodiment 5

X-ray sensitive material
Substrate
Embodiment 6

X-ray sensitive material in binder
Substrate
Embodiment 7

X-ray sensitive material in adhesive
Embodiment 8

X-ray sensitive material in adhesive
Substrate
Embodiment 9

X-ray sensitive material
Adhesive
Substrate
Embodiment 10

X-ray sensitive material in binder
Adhesive
Substrate
Embodiment 11

X-ray sensitive material
Substrate
Adhesive
Embodiment 12

X-ray sensitive material in binder
Substrate
Adhesive
Embodiment 13

X-ray sensitive material
Adhesive
Substrate
Adhesive
Embodiment 14

X-ray sensitive material in binder
Adhesive
Substrate
Adhesive

---

To be tamper proof, the indicator must be packaged in such a way that prevents anyone from having access to the indicator. The packaging could be comprised of metal, polymer or other components. In some cases, tamper proof may be considered to be the highest level of tamper evident. Tamper evident means that a package that has undergone tampering will show immediate signs that tampering has occurred. A few examples of these immediate signs could include audible signals such as an alarm or absence of a vacuum when a package is opened as well as visual signs such as a color change when exposed to air, color imprinted tapes, images on films that distort, destructible films with alphanumeric symbols or bar codes that flake when peeled away, evidence tapes that leave a word (as an example "opened") or phrase on the package when peeled, holograms, and other components that clearly point out that the package with an indicator has been tampered with. Another warning that a package has been tampered with is the release of an offensive odor if a package has been tampered with.

An effective way to make screened baggage tamper proof after it has passed through X-ray screening is by affixing on its locks tamper proof adhesive labels (tape) bearing radiochromic sensors. The sensors in turn may undergo chromatic change to reveal a message that includes text, graphic and images. The adhesive is preferably pressure sensitive. The sensor containing label consists of a face stock material, a pressure sensitive adhesive and a liner. The sensor containing label substrate consisting of the face stock, pressure sensitive adhesive and liner are typically laminated and then exposed to X-radiation preferably through a mask. Prior to exposure to X-radiation the label may be fixed on to the locks of checked airport baggage. After exposure the labels may reveal a message in addition to a color change indicating that the baggage has been X-rayed. X-ray exposure can be accomplished using a sealed X-ray tube, rotating anode X-ray source, a synchrotron, or an X-ray emitting radioactive source. These X-ray sources can be part of an airport X-ray scanning system, stand alone X-ray system, or a handheld X-ray system. The X-ray exposure time can range from less than one second to minutes, with the preferred time being 0.001 seconds to 15 minutes, and a more preferred time being 0.001 to 15 seconds.

The following examples illustrate the practice of this invention. They are not intended to be exhaustive of all possible variations of the invention. Parts and percentages are by weight unless otherwise indicated.

EXAMPLES

Example 1

Inorganic materials were exposed to an X-ray beam for specified time and defined X-ray source voltage and current settings. These materials showed a color change as detailed in Table 1.

TABLE 1

Effect of X-ray Exposure on X-ray Sensitive Inorganic Materials

| Material | X-ray Source | X-ray Source Kilovolts | X-ray Source Current Milliamps | Exposure Time | Material Color Before X-ray Exposure | Material Color After X-ray Exposure |
|---|---|---|---|---|---|---|
| Potassium chloride | X-ray tube | 75 | 40 | 1 minute | White | Purple |
| Potassium chloride | X-ray tube | 75 | 40 | 3 minutes | White | Purple |
| Sodium bromide | X-ray tube | 75 | 40 | 1 minute | White | Light Blue |
| Sodium chloride | X-ray tube | 75 | 40 | 1 minute | White | Golden Yellow |
| Potassium iodide | X-ray tube | 75 | 40 | 1 minute | White | Green |
| Zirconium oxide | Rotating Anode | 50 | 300 | 1 minute | White | Black |
| Zirconium oxide | Rotating Anode | 50 | 300 | 5 minutes | White | Black |
| Sodium Bicarbonate | Rotating Anode | 50 | 300 | 5 minutes | White | Light Pink |
| Silver Sulfide | Rotating Anode | 50 | 300 | 3 minutes | White | Brown |
| Tin Oxide | Rotating Anode | 50 | 300 | 5 minutes | Light Gray | Dark Gray |

All materials in Table 1 showed a color change upon X-ray exposure without any chemical or physical processing steps. All materials in Table 1 do not show a color change upon exposure to ambient light, including ultraviolet light.

Comparative Example 1

Inorganic materials were exposed to an X-ray beam for specified time and defined X-ray source voltage and current settings. These materials did not show a color change as detailed in Table 1A.

TABLE 1A

Effect of X-ray Exposure on non-X-ray Sensitive Inorganic Materials

| Material | X-ray Source | X-ray Source Kilovolts | X-ray Source Current Milliamps | Exposure Time | Material Color Before X-ray Exposure | Material Color After X-ray Exposure |
|---|---|---|---|---|---|---|
| Laponite Clay | X-ray tube | 75 | 40 | 1 minute | White | White |
| Titanium Dioxide | Rotating Anode | 50 | 300 | 5 minutes | White | White |

The materials in Table 1A did not show a color change upon X-ray exposure. All materials in Table 1A are comparative examples of inorganic materials that are not usable as an X-ray indicator in the invention as described.

Example 2

Organic materials were exposed to an X-ray beam for specified time and defined X-ray source voltage and current settings. These materials showed a color change as detailed in Table 2.

TABLE 2

Effect of X-ray Exposure on X-ray Sensitive Organic Materials

| Material | X-ray Source | X-ray Source Kilovolts | X-ray Source Current Milliamps | Exposure Time | Material Color Before X-ray Exposure | Material Color After X-ray Exposure |
|---|---|---|---|---|---|---|
| CD2* | X-ray tube | 75 | 40 | 3 minutes | White | Dark Pink |

*CD2: color developer agent 2-amino-5-diethylaminotoluene hydrochloride

All materials in Table 2 showed a color change upon X-ray exposure without any chemical or physical processing steps. All materials in Table 2 do not show a color change upon exposure to ambient light, including ultraviolet light.

Comparative Example 2

Organic materials were exposed to an X-ray beam for specified time and defined X-ray source voltage and current settings. These materials did not show a color change as detailed in Table 2A.

TABLE 2A

Effect of X-ray Exposure on non-X-ray Sensitive Organic Materials

| Material | X-ray Source | X-ray Source Kilovolts | X-ray Source Current Milliamps | Exposure Time | Material Color Before X-ray Exposure | Material Color After X-ray Exposure |
|---|---|---|---|---|---|---|
| Pigment Yellow 74 | Rotating Anode | 50 | 300 | 15 minutes | Yellow | Yellow |
| ST206AL | Rotating Anode | 50 | 300 | 15 minutes | White | White |

The materials in Table 2A did not show a color change upon X-ray exposure. All materials in Table 2A are comparative examples of organic materials that are not usable as an X-ray indicator in the invention as described.

Example 3

Polymeric materials were exposed to an X-ray beam for specified time and defined X-ray source voltage and current settings. These materials showed a color change as detailed in Table 3.

TABLE 3

Effect of X-ray Exposure on X-ray Sensitive Polymeric Materials

| Material | X-ray Source | X-ray Source Kilovolts | X-ray Source Current Milliamps | Exposure Time | Material Color Before X-ray Exposure | Material Color After X-ray Exposure |
|---|---|---|---|---|---|---|
| 5 minute Devcon Epoxy* | X-ray tube | 75 | 40 | 1 second | Clear | Yellow-orange |

TABLE 3-continued

Effect of X-ray Exposure on X-ray Sensitive Polymeric Materials

| Material | X-ray Source | X-ray Source Kilovolts | X-ray Source Current Milliamps | Exposure Time | Material Color Before X-ray Exposure | Material Color After X-ray Exposure |
|---|---|---|---|---|---|---|
| 5 minute Devcon Epoxy | X-ray tube | 75 | 40 | 5 seconds | Clear | Yellow-orange |
| 5 minute Devcon Epoxy | X-ray tube | 75 | 40 | 10 seconds | Clear | Yellow-orange |
| 5 minute Devcon Epoxy | X-ray tube | 75 | 40 | 15 seconds | Clear | Yellow-orange |

*Bisphenol-A diglycidyl ether resin (DGEPBA) mixed with hardener consisting of a polyamine-polymercaptan mixture, commercially available from ITW Devcon, Danvers, Mass.)

The materials in Table 3 showed a color change upon a wide range of X-ray exposure times without any chemical or physical processing steps. All materials in Table 3 do not show a color change upon exposure to ambient light, including ultraviolet light.

Comparative Example 3

Polymeric materials were exposed to an X-ray beam for specified time and defined X-ray source voltage and current settings. These materials did not show a color change as detailed in Table 3A.

TABLE 3A

Effect of X-ray Exposure on non-X-ray Sensitive Polymeric Materials

| Material | X-ray Source | X-ray Source Kilovolts | X-ray Source Current Milliamps | Exposure Time | Material Color Before X-ray Exposure | Material Color After X-ray Exposure |
|---|---|---|---|---|---|---|
| Poly(ethylene) terephthalate | X-ray tube | 75 | 40 | 1 minute | Clear | Clear |
| Cellulose triacetate | X-ray tube | 75 | 40 | 1 minute | Clear | Clear |

The materials in Table 3A did not show a color change upon X-ray exposure. All materials in Table 3A are comparative examples of organic materials that are not usable as an X-ray indicator in the invention as described.

Example 4

Composite materials comprised of at least two different materials were exposed to an X-ray beam for specified time and defined X-ray source voltage and current settings. These materials showed a color change as detailed in Table 4.

TABLE 4

Effect of X-ray Exposure on X-ray Sensitive Composite Materials

| Material | Material Type | X-ray Source | X-ray Source Kilovolts | X-ray Source Current Milliamps | Exposure Time | Material Color Before X-ray Exposure | Material Color After X-ray Exposure |
|---|---|---|---|---|---|---|---|
| Potassium chloride and 5 minute epoxy | Inorganic and polymeric | X-ray tube | 75 | 40 | 2 minutes | White | Magenta |

TABLE 4-continued

Effect of X-ray Exposure on X-ray Sensitive Composite Materials

| Material | Material Type | X-ray Source | X-ray Source Kilovolts | X-ray Source Current Milliamps | Exposure Time | Material Color Before X-ray Exposure | Material Color After X-ray Exposure |
|---|---|---|---|---|---|---|---|
| Potassium chloride and polyethylene terephthalate | Inorganic and polymeric | X-ray tube | 75 | 40 | 2 minutes | White | Purple |
| Rubidium chloride and 5 minute epoxy | Inorganic and polymeric | X-ray tube | 75 | 40 | 2 minutes | White | Green |
| Sodium chloride, potassium chloride, potassium iodide and 5 minute epoxy | Inorganic and polymeric | X-ray tube | 75 | 40 | 2 minutes | White | Golden yellow, magenta, and green |
| Potassium chloride and 5 minute epoxy | Inorganic and polymeric | X-ray tube | 75 | 40 | 2 minutes | White | Magenta |
| Potassium chloride and 5 minute epoxy | Inorganic and polymeric | X-ray tube | 75 | 40 | 1 second | White | Magenta |
| Potassium chloride and 5 minute epoxy | Inorganic and polymeric | X-ray tube | 75 | 40 | 5 seconds | White | Magenta |
| Potassium chloride and 5 minute epoxy | Inorganic and polymeric | X-ray tube | 75 | 40 | 10 seconds | White | Magenta |
| Potassium chloride and 5 minute epoxy | Inorganic and polymeric | X-ray tube | 75 | 40 | 15 seconds | White | Magenta |
| Triphenyl-tetrazolium chloride and cerium dioxide | Organic and inorganic | X-ray tube | 75 | 40 | 3 minutes | Light yellow | Dark red |
| Triphenyl-tetrazolium chloride and titanium dioxide | Organic and inorganic | X-ray tube | 75 | 40 | 3 minutes | White | Light red |
| Triphenyl-tetrazolium chloride and gadolinium oxysulfide: terbium doped | Organic and inorganic phosphor | X-ray tube | 75 | 40 | 3 minutes | White | Dark red |
| Triphenyl-tetrazolium chloride and barium fluoride bromide: europium doped | Organic and inorganic phosphor | X-ray tube | 75 | 40 | 3 minutes | Yellow | Brown-red |
| HTD and Duco cement | Organic and polymeric | X-ray tube | 75 | 40 | 2 minutes | Clear | Light orange |
| HTD and Duco cement | Organic and polymeric | X-ray tube | 75 | 40 | 10 minutes | Clear | Dark orange |

All materials in Table 4 showed a color change upon X-ray exposure without any chemical or physical processing steps. All materials in Table 4 do not show a color change upon exposure to ambient light, including ultraviolet light.

Example 5

In a glass bottle 4 grams of Potassium Chloride were dissolved in 20 milliliters of water. A 1¼ inch diameter circle of standard cellulose based white paper was immersed in the salt solution for 10 seconds, removed, placed on a Teflon sheet to dry in ambient air. The dried Example 5 sample was exposed to an X-ray beam for specified time and defined X-ray source voltage and current settings. This dip coated composite material showed a color change as detailed in Table 5.

TABLE 5

Effect of X-ray Exposure on X-ray Sensitive Dip Coated Composite Material

| X-ray Sensitive Component | Support | X-ray Source | X-ray Source Kilovolts | X-ray Source Current Milliamps | Exposure Time | Material Color Before X-ray Exposure | Material Color After X-ray Exposure |
|---|---|---|---|---|---|---|---|
| Potassium chloride | Paper | X-ray tube | 75 | 40 | 2 minute | White | Purple |

The dip coated composite in Table 5 showed a color change upon X-ray exposure without any chemical or physical processing steps. The dip coated composite in Table 5 does not show a color change upon exposure to ambient light, including ultraviolet light.

Example 6

X-ray sensitive materials were coated in a binder onto a base. The dried Example 6 samples were exposed to an X-ray beam for specified time and defined X-ray source voltage and current settings. These knife coated composite materials showed a color change as detailed in Table 6.

TABLE 6

Effect of X-ray Exposure on X-ray Sensitive Knife Coated Composite Materials

| X-ray Sensitive Component | Binder | Support | X-ray Source | X-ray Source Kilovolts | X-ray Source Current Milliamps | Exposure Time | Material Color Before X-ray Exposure | Material Color After X-ray Exposure |
|---|---|---|---|---|---|---|---|---|
| Potassium chloride | Witco 320 | Poly(ethylene terephthalate) | X-ray tube | 75 | 40 | 2 minutes | Frosted white | Light purple |
| Potassium chloride | Witco 320 | Poly(ethylene terephthalate) | X-ray tube | 75 | 40 | 15 minutes | Frosted white | Purple |
| Potassium chloride | Air Vol 205 | Poly(ethylene terephthalate) | X-ray tube | 75 | 40 | 2 minutes | Clear | Light purple |
| HTD | 344 Adhesive | Poly(ethylene terephthalate | X-ray tube | 75 | 40 | 15 minutes | Clear | Light purple |
| HTD | Duco cement | Aluminum | X-ray tube | 75 | 40 | 5 minutes | Yellow | Dark Orange |

All materials in Table 6 showed a color change upon X-ray exposure without any chemical or physical processing steps. All materials in Table 6 do not show a color change upon exposure to ambient light, including ultraviolet light.

Comparative Example 4

Binders used in Example 6 were coated onto supports, without the X-ray sensitive material. These binder coated supports were exposed to an X-ray beam for specified time and defined X-ray source voltage and current settings. These materials did not show a color change as detailed in Table 6A.

TABLE 4A

Effect of X-ray Exposure on X-ray Sensitive Knife Coated Binder on Support Composite Materials

| X-ray Sensitive Component | Binder | Support | X-ray Source | X-ray Source Kilovolts | X-ray Source Current Milliamps | Exposure Time | Material Color Before X-ray Exposure | Material Color After X-ray Exposure |
|---|---|---|---|---|---|---|---|---|
| None | Witco 320 | Poly(ethylene terephthalate) | X-ray tube | 75 | 40 | 2 minutes | Frosted white | Frosted white |
| None | Air Vol 205 | Poly(ethylene terephthalate) | X-ray tube | 75 | 40 | 2 minutes | Clear | Clear |
| None | 344 Adhesive | Poly(ethylene terephthalate) | X-ray tube | 75 | 40 | 2 minutes | Clear | Clear |

The binder on support composite materials in Table 6A did not show a color change upon X-ray exposure. The results in Table 6A indicate that there must be an X-ray sensitive material coated with the binder, as shown in Example 6, before the binder coating can be used as an effective X-ray exposure indicator as described in this invention.

Comparative Example 5

Commercially available radiochromic detectors on polymer support were exposed to an X-ray beam for specified time and defined X-ray source voltage and current settings. These commercially available detectors must meet the following criteria: color change due to X-ray exposure, no color change to ultraviolet (UV-254 nanometers) light exposure, no color change due to fluorescent (ambient) room light exposure. The results for testing these commercially available radiochromic detectors are shown in Table 5A.

TABLE 5A

Effect of X-ray, ultraviolet, and ambient light exposure on commercially available radiochromic detectors.

| Commercially available X-ray Sensitive Component | X-ray Source | X-ray Source Kilovolts | X-ray Source Current Milliamps | Exposure Time | Material Color Before Exposure | Material Color After X-ray Exposure | Material Color After UV Exposure | Material Color After Ambient Exposure | Passes three criteria |
|---|---|---|---|---|---|---|---|---|---|
| Gafchromic HD-810 | X-ray tube | 75 | 40 | 3 min | Clear | Dark blue | Dark blue | Light blue | No |
| Far West FWT-60 | X-ray tube | 75 | 40 | 2 min | Clear | Dark blue | Dark blue | Light blue | No |
| Kodak linagraph paper | X-ray tube | 75 | 40 | 2 min | Pink | Black | Dark grey | Grey | No |

The commercially available radiochromic detectors in Table 5A did not meet the criteria for an X-ray exposure detector as defined in this invention. Specifically, they all show a color change upon exposure to UV and ambient light. This failure to be unaffected by UV or ambient light will have a detrimental effect when trying to correctly interpret if a package or luggage has been inspected before placement onto an airplane or other means of transportation. The results in Table 5A indicate commercially available radiochromic films cannot be used as an effective X-ray exposure indicator as described in this invention.

Example 7

Organometallic material was exposed to an X-ray beam for specified time and defined X-ray source voltage and current settings. This material showed a color change as detailed in Table 7.

TABLE 7

Effect of X-ray Exposure on X-ray Sensitive Organometallic Materials

| Material | X-ray Source | X-ray Source Kilovolts | X-ray Source Current Milliamps | Exposure Time | Material Color Before X-ray Exposure | Material Color After X-ray Exposure |
|---|---|---|---|---|---|---|
| NaEDTA* | Rotating Anode | 50 | 300 | 5 minutes | White | Light Yellow |

*Sodium ethylene diamine tetraacetic acid

The material in Table 7 showed a color change upon X-ray exposure without any chemical or physical processing steps. The material in Table 7 does not show a color change upon exposure to ambient light, including ultraviolet light.

Comparative Example 6

Organometallic materials were exposed to an X-ray beam for specified time and defined X-ray source voltage and current settings. These materials did not show a color change as detailed in Table 6A.

TABLE 6A

Effect of X-ray Exposure on non-X-ray Sensitive Organometallic Materials

| Material | X-ray Source | X-ray Source Kilovolts | X-ray Source Current Milliamps | Exposure Time | Material Color Before X-ray Exposure | Material Color After X-ray Exposure |
|---|---|---|---|---|---|---|
| Alq3 | Rotating Anode | 50 | 300 | 15 minutes | Yellow | Yellow |
| CuPc | Rotating Anode | 50 | 300 | 15 minutes | Blue | Blue |
| NaAcetate | Rotating Anode | 50 | 300 | 15 minutes | White | White |

The materials in Table 6A did not show a color change upon X-ray exposure. All materials in Table 6A are comparative examples of organometallic materials that are not usable in the invention as described.

Example 8

Figure 4:
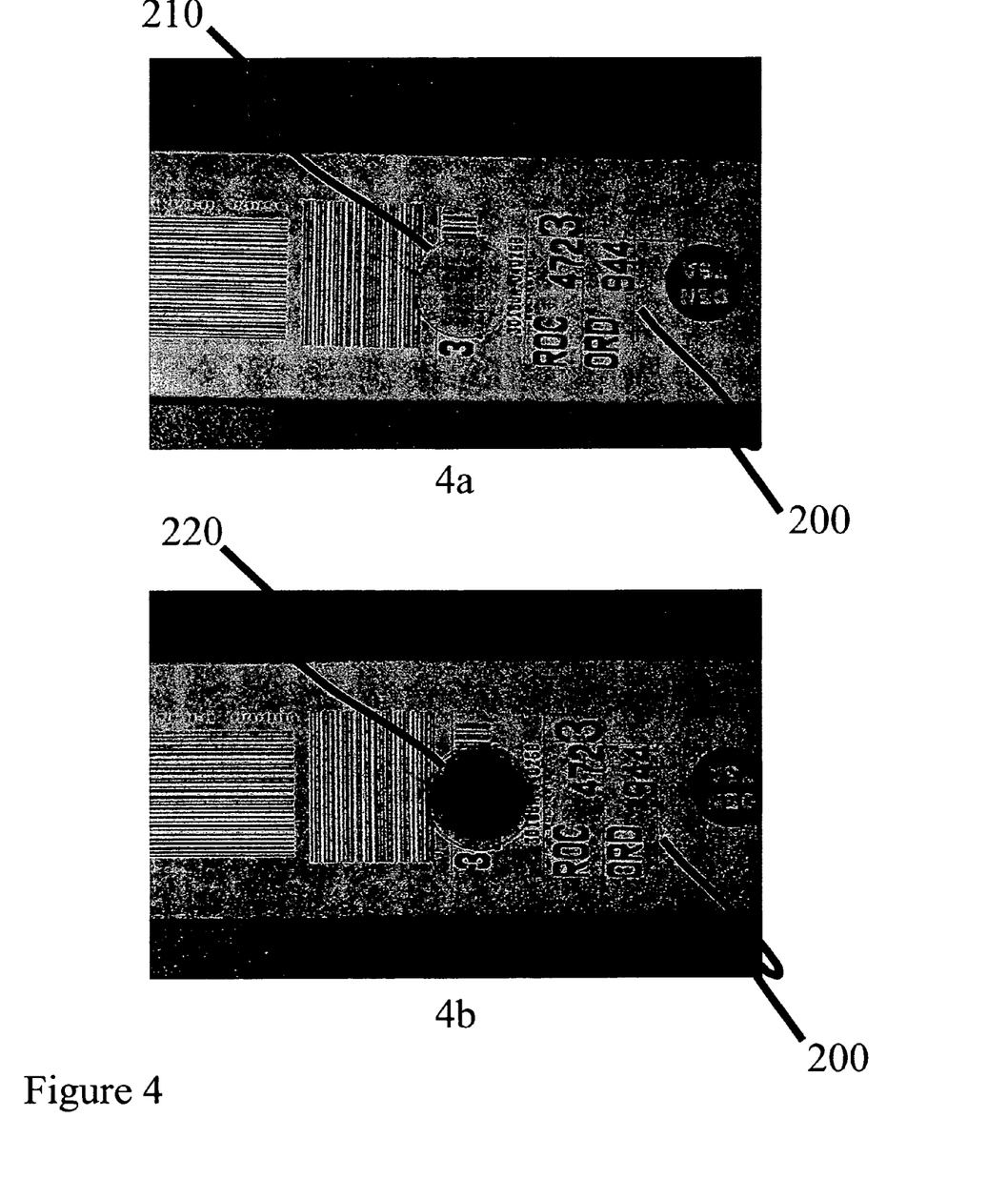
FIG. 4—An X-ray exposure indicator device attached to an airline luggage tag (a) before X-ray radiation, (b) after X-ray radiation.

One gram of potassium chloride was added to 9 grams of 5-minute epoxy, mixed with a spatula for 30 seconds. This composite was cast onto a Teflon sheet. After the composite cured, the composite film was removed from the Teflon and a 1¼ inch circular disk was punched from the free standing composite film using a hand punch and rubber hammer. To the backside of the circular composite disk was attached one side of a double-sided pressure sensitive adhesive layer. The device comprising a solid inorganic X-ray sensitive material dispersed in an X-ray sensitive polymer matrix, and an adhesive layer is identified as an X-ray exposure indicator device 210, as shown in FIG. 4a. X-ray exposure indicator device 210 is frosty white in color and shows no significant color change when exposed to visible or UV light. The opposite side of the adhesive layer was attached to a substrate 200 comprising an airline luggage tag or sheet. An X-ray tube operated at 75 kilovolts, 40 milliamps, was used to expose X-ray exposure indicator device 210 for one minute. In FIG. 4b, Exposed X-ray exposure indicator 220 shows a color change has occurred due to X-ray exposure. The color of the Exposed X-ray exposure indicator 220 is dark magenta.

Example 8 successfully demonstrates an X-ray exposure indicator device comprising a solid X-ray sensitive material that upon X-ray exposure undergoes a chromatic change, wherein the exposure indicator device does not significantly change color when subjected to UV or visible radiation.

The invention has been described in detail with particular reference to certain preferred embodiments thereof, but it will be understood that variations and modifications can be effected within the spirit and scope of the invention.

MATERIALS LIST

10 X-ray source
20 X-ray sensitive material
30 base
40 X-ray radiation
50 mask
60 X-ray sensitive material
70 X-ray phosphor
80 photochromic
90 UV blocker
100 visible image
200 substrate
210 X-ray exposure indicator device
220 Exposed X-ray exposure indicator

What is claimed is:
1. An X-ray exposure indicator device comprising a solid X-ray sensitive material that upon X-ray exposure undergoes a chromatic change without additional processing of the X-ray exposure indicator device after X-ray exposure, wherein the solid X-ray sensitive material does not significantly change color when subjected to UV or visible radiation, and wherein said X-ray sensitive material comprises X-ray sensitive organic material.

2. The indicator of claim 1 wherein said solid X-ray sensitive material comprises an X-ray sensitive material dispersed in a matrix.

3. The indicator of claim 1 wherein said X-ray exposure indicator comprises an adhesive layer.

4. The indicator of claim 1 wherein said X-ray sensitive material comprises binder.

5. The indicator of claim 1 wherein said X-ray sensitive material comprises X-ray sensitive polymeric resin.

6. The indicator of claim 1 wherein said X-ray sensitive material comprises X-ray sensitive epoxy resins.

7. The indicator of claim 1 wherein said X-ray sensitive material comprises organometallic material.

8. The indicator of claim 1 wherein said X-ray sensitive material comprises metal EDTAs.

9. The indicator of claim 1 wherein said indicator comprises a substrate having attached thereto the X-ray sensitive material.

10. The indicator of claim 1 wherein said indicator comprises a substrate having attached thereto the X-ray sensitive material wherein said substrate comprises a sheet and said X-ray sensitive material comprises a continuous layer on said sheet.

11. The indicator of claim 10 wherein said indicator comprises an adhesive layer.

12. The indicator of claim 11 wherein said adhesive layer comprises Xray sensitive material.

13. The indicator of claim 1 wherein said indicator comprises a sheet comprising X-ray sensitive material in a matrix material and adhesive material in contact with said sheet.

14. The indicator of claim 1 wherein said X-ray sensitive material is in a pattern.

15. The indicator of claim 1 wherein said indicator is provided with a mask that is a barrier to X-ray exposure in a portion of said indicator.

16. The indicator of claim 1 wherein said chromatic change is a change of any combination of primary colors red, green, and blue to any combination of primary colors red, green, and blue; any combination of primary colors red, green, and blue to any combination of secondary colors yellow, cyan, and magenta; any combination of secondary colors yellow, cyan, and magenta to any combination of secondary colors yellow, cyan, and magenta; or any combination of secondary colors yellow, cyan, and magenta to any combination of primary colors red, green and blue.

17. The indicator of claim 1 wherein said chromatic change is a change of shade.

18. The indicator of claim 1 wherein said chromatic change reveals a message.

19. The indicator of claim 1 wherein said indicator comprises a base sheet and said sheet is formed from at least one material selected from the group consisting of metal foils, paper, and polymer.

20. An X-ray exposure indicator device comprising a solid X-ray sensitive material that upon X-ray exposure undergoes a chromatic change without additional processing of the X-ray exposure indicator device after X-ray exposure, wherein the solid X-ray sensitive material does not significantly chanae color when subjected to UV or visible radiation, wherein said X-ray sensitive material comprises dyes, organic amines, triphenyl tetrazolium salts.

21. A method of indicating X-ray exposure comprising providing an X-ray exposure indicator comprising a solid X-ray sensitive material that upon X-ray exposure undergoes a chromatic change without additional processing of the indicator after X-ray exposure and wherein the X-ray sensitive material does not significantly change color when subjected to UV or visible radiation, affixing said X-ray exposure indicator to an article, subjecting said article and X-ray exposure indicator to X-ray exposure, and observing a chromatic change that indicates X-ray exposure, wherein said X-ray sensitive material comprises X-ray sensitive organic material.

22. The method of claim 21 wherein said article comprises luggage.

23. The method of claim 21 wherein said article comprises radiographic imaging cassette.

24. The method of claim 21 wherein said subjecting said article and X-ray exposure indicator to said exposure is carried out in a transportation site.

25. The method of claim 21 wherein said X-ray exposure indicator comprises an adhesive tape.

* * * * *